Feb. 23, 1932.   A. W. KEGLER   1,846,396
FEEDING APPARATUS
Filed April 30, 1928   2 Sheets-Sheet 1

Inventor
ANTON W. KEGLER

By Paul, Paul & Moore
Attorneys

Inventor
ANTON W. KEGLER
By Paul, Paul & Moore
Attorneys

Patented Feb. 23, 1932

1,846,396

UNITED STATES PATENT OFFICE

ANTON W. KEGLER, OF MINNEAPOLIS, MINNESOTA, ASSIGNOR TO H. D. HUDSON MANUFACTURING COMPANY, OF MINNEAPOLIS, MINNESOTA, A CORPORATION OF MINNESOTA

FEEDING APPARATUS

Application filed April 30, 1928. Serial No. 273,974.

This invention relates to improvements in feeding apparatus, and has among its objects to provide a device which is conveniently usable as a chicken feeder; to provide means whereby the feed in a feed receptacle is kept in loosened condition as the result of animals mounting to and leaving feeding position; to provide a trough or troughs and to provide an element rockably arranged and adapted to be tipped as the fowls mount and leave it along with an agitator extending into a stored-feed portion of the receptacle and connections between the rockable element and agitator such that the rocking motion of the element moves the agitator to prevent clogging of the feed, along with troughs in communication with the feed storage receptacle which troughs are accessible to the fowls when mounted upon the rockable element; to provide means connected to operate the agitator element and acting also to return dropped food to the troughs to prevent waste; to use this element as an intermediate between the agitator elements and the tippable element to operate said agitator elements; to provide a construction for mounting the chute, as a dropped-feed returning element, including constructional details; and to generally provide a simple device of the character, and for all the purposes set forth hereafter.

Figure 1:
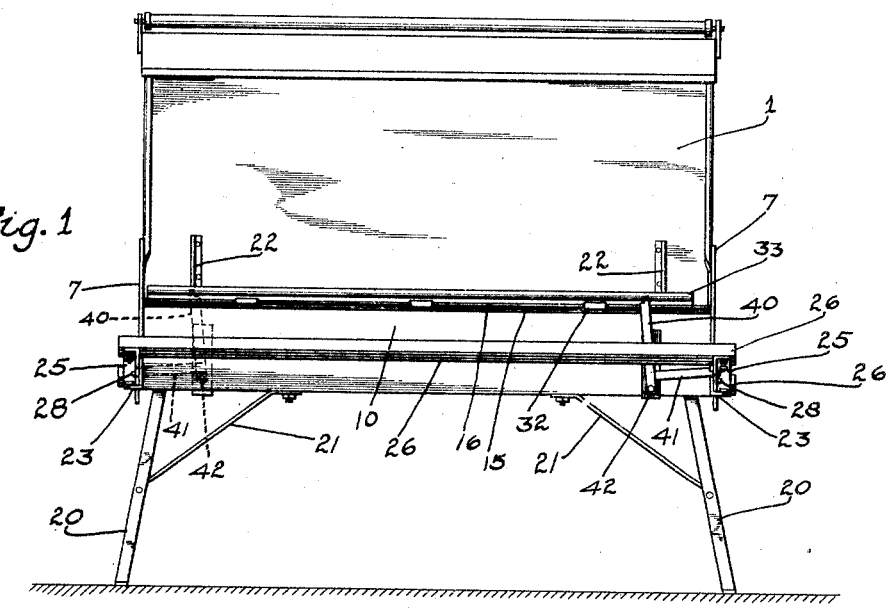
Figure 2:
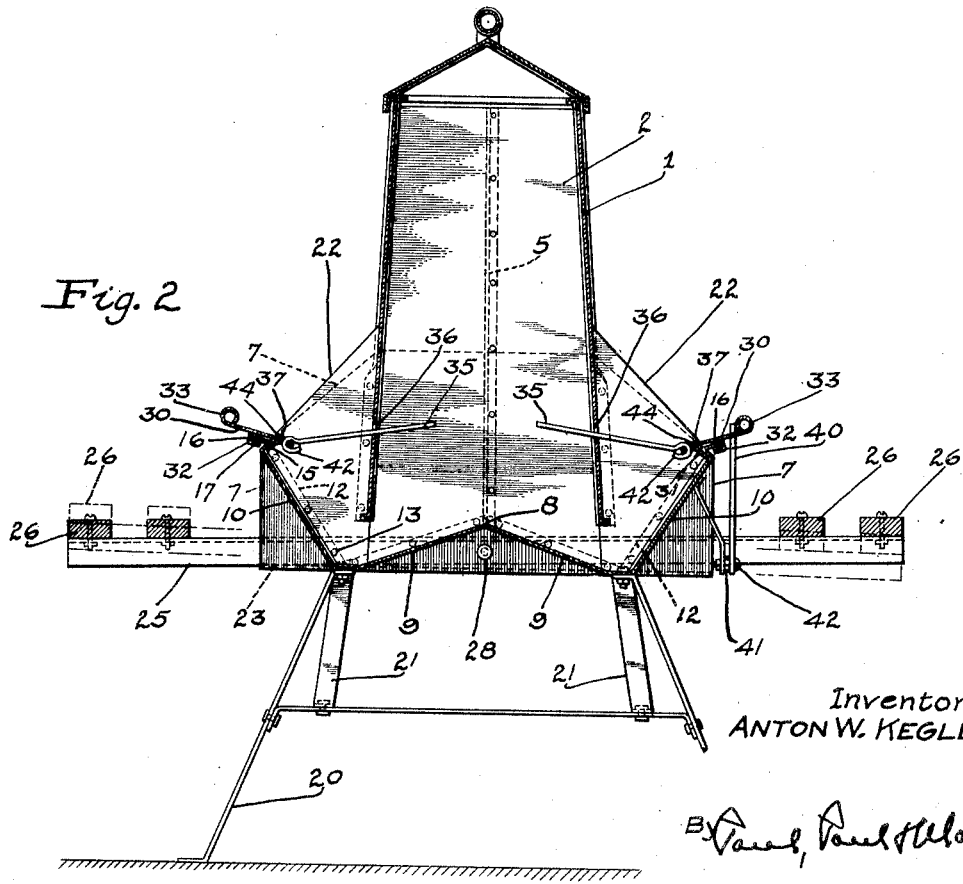
Figures 3, 4:
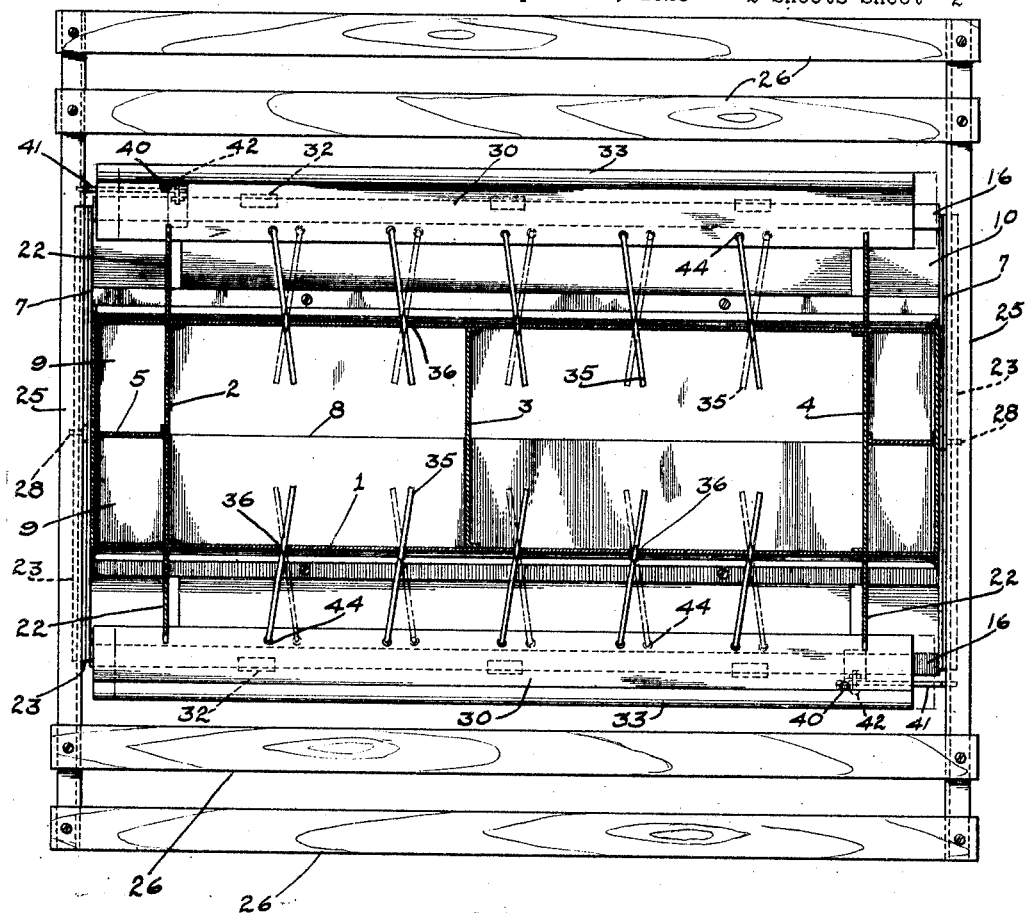

Advantages of the invention will be pointed out in the description of the drawings forming a part of this application, and in said drawings Figure 1 is a side elevation;
Figure 2 is a vertical transverse section;
Figure 3 is a plan section; and
Figure 4 is a detail view showing the slide construction and construction for mounting it upon the trough.

The device comprises a main receptacle 1, see Figure 3, partitioned as at 2, 3, 4 and 5 to provide compartments for foods of different character, said partitions in this instance dividing the feed receptacle into six compartments. As best shown in Figure 2, this receptacle is centrally arranged with respect to the structure, and provides troughs one at each of two opposite sides. The manner of forming these troughs including a single piece which forms the bottom of the receptacle, and bottoms and sides of the trough, is a feature of this invention.

This formation is as follows: The bottom of the receptacle 1 is open as best shown in Figure 2, and at each opposite end of the receptacle is attached a plate 7. This plate extends below the open end of the receptacle. Extending between these plates and connected by its ends to them is a bottom and trough-forming element having a central portion upwardly bent as at 8 to form a peak or ridge and provide portions 9 slanting in opposite directions, and further having outwardly slanted upwardly bent portions which form the longitudinal outer walls of the troughs. This bottom-forming element is flanged at opposite ends, one of the flanges being shown in dotted lines at 12, the flange extends the full length, and being connected by suitable fastening devices 13 to plate 7. As best shown in Figure 4, each portion 10 at its upper terminal is bent inwardly as at 15, and then outwardly as at 16. The portion 16 being rebent as at 17 as a reinforcement. The portion 16 provides a chute slanting inwardly for returning dropped food to the troughs. This construction further provides means for mounting a slide which in some constructions takes the place of the chute 16, and also acts as means for operating agitator members later to be described. The receptacle is supported on a suitable base, in this instance, comprising two legs 20 each composed of strap iron and each connected by suitable braces 21.

The slanting portions 9 of the bottom facilitate the movement of the food outwardly towards the troughs. It will be noted that with substantially three elements, to-wit the end pieces 7 and the bottom element, not only the bottom of the central compartment 1 is formed but the bottoms and sides of both troughs. Suitable partitions 22 are provided in the troughs. These partitions correspond to the partitions 2 and 4 of the receptacle and may be considered extensions of these partitions into the trough so that each trough is divided, in this instance, into three compartments.

Another feature of the invention is the provision of means for agitating the feed in the main receptacle 1 to prevent clogging and therefore to facilitate flow or movement into the troughs. For this purpose, an element is rockably arranged and adapted to be tipped as the fowls mount and leave it, and broadly the arrangement is such that the agitator elements are so connected with this tippable frame that the movements of the fowls in mounting and leaving the feed troughs, are utilized to keep the feed in loosened condition. While the details of construction will be described, there is no intention to limit the invention to these details although they are, of course, also claimed.

In this embodiment of the invention, the rockable element has the form of a frame which circumscribes the receptacle and troughs and has elements 25, in this instance angle irons, pivoted to each of the two opposite ends of the receptacle to extend transversely of the receptacle. Mount bars 26 cross-connect these end elements 25 and are arranged adjacent the troughs so that when the fowls are mounted thereon they are in position for feeding from the troughs. The pivotal points of the frame with the central receptacle are indicated at 28, although it will be understood that the tippable element may be connected in other ways, and that the construction may be varied without departing from the spirit of the invention.

A feature of this invention includes the device for limiting the rocking movement of the elements 25. This device is most clearly shown in Figures 2 and 3. It will be noted that each plate 7 has an outwardly turned lower flange 23 above which an element 25 lies. It will be seen by an inspection of Figure 2 that the flange 23 limits the rocking motion of an element 25 in both directions by the alternate engagement of different portions of that element therewith. Thus the end elements 7 also provide means integral therewith for forming stops.

Mounted upon the upper outer edges of the slanting side elements 10 of each trough, see Figure 4, is a combined slide and chute element 30, which has guide extensions 31—32 on its lower side respectively engaging the lower sides of the elements 15 and 16, to slidably or translatably connect the element 30, and secure it in operative position against tipping. As shown in Figure 3, each element 30 is of less length than the trough to which it is attached, so that it has a limited sliding movement, in this instance a relatively smaller movement. The plates 7 act as stops.

Movable by the slide are agitator elements 35 which extend into the stored-feed portion of the receptacle, and are rockable upon said receptacle to loosen the feed. In this instance, the rockable mounting for these elements is obtained causing each element to project loosely through an opening 36 in the side wall of the receptacle 1. As will be seen when the elements 30 are translated alternately in opposite directions, the elements 35 are correspondingly rocked in a horizontal plane. It is conceivable that the elements 35 may be mounted in other ways but mounting in the manner shown discloses a cheap and convenient construction and is claimed as such. The partition elements 22 are cut away as at 37 to loosely receive the slides 30.

The means employed as connections between the frame and chutes 30 comprise in this instance, see Figure 1, bellcrank levers each having an arm 40 engaging an opening 41 of the chute, see Figure 3, and each having an arm 41 engaging an opening of the element 25. This opening is not shown in the drawings but the connection is similar to the connection of the other arm with the element 30. Each bellcrank lever is pivoted at 42. As will be seen the arrangement is such that when the tippable element is swung in opposite directions, the bellcrank levers are correspondingly swung and the slides and agitator elements follow. The agitator elements 35 have eyes 43 engaging openings 44 of the slide-chutes, see Figure 4.

Among other things, therefore, a device is provided including a feed receptacle along with an element pivoted thereto to rock, with agitator elements arranged to move and loosen the feed along with connections between the tippable or rockable element and the agitator elements whereby said elements are moved to agitate or loosen the feed as the fowls tip the mount element respectively as they mount and leave it. The outer edges of each chute-slide is bent as at 33 as a guard to prevent loss of dropped-food and as a reinforcement.

Features of the invention include the broad idea of utilizing the movement of the fowls in mounting and leaving the trough, as a means for operating both the agitators and the means for returning dropped food to the trough, it being understood that these return feed chutes may be used with the agitator elements and oscillated to facilitate a return movement of the feed.

Another feature of the invention is the downwardly flared relation of the sides of the receptacle 1, in combination with the slanting bottom 9. This downwardly outwardly flared relation of the walls of the receptacle 1 prevents clogging and facilitates downward travel of the food toward the delivery opening or openings or toward the point or points where it enters the trough or troughs. By this means a small size trough can be successfully built so that the feed will not clog, and so that a small quantity only is delivered in the bottom of the troughs, which quantity will always be disposed of before it sours, and in case of contamination by litter only a small quantity will have to be scraped out. This is a valuable economic feature. Moreover, a uniform feed of the material to the trough can be maintained. This is a very important feature of the invention.

I claim as my invention:

1. A feed receptacle having a trough, a frame pivoted to the receptacle and having a mount bar thereon, an agitator element rockable upon and extending into the receptacle to loosen the feed, and means for operating the agitator element as the result of motion of the frame including an element translatably mounted upon the trough.

2. A feed receptacle having troughs, a frame pivoted to the receptacle and having mount bars thereon, a chute slidably arranged on each trough to return dropped food thereto, agitator elements connected to the chutes and rockable upon and extending into the receptacle to loosen the feed and connections between the frame and the chutes whereby as the frame is rocked the chutes are moved lengthwise of the troughs.

3. A feed receptacle having a trough, a mount element rockably arranged upon the receptacle, an element longitudinally movable upon the trough and arranged to return dropped food to the trough, and having agitator elements connected thereto and mounted upon and extended into the receptacle, said mount element being rockable as the result of fowls respectively mounting and leaving it, and connections between the food-return element and the rockable mount to cause longitudinal movement of said element alternately in opposite directions as said mount is correspondingly rocked.

4. A feed receptacle having troughs one at each opposite side, a frame circumscribing the receptacle and troughs and pivoted to the receptacle, and having mount bars adjacent the trough, a combined slide and chute translatably arranged upon the outer edge of each trough lengthwise thereof to return dropped food to the troughs, agitator elements movable by the slides and rockably mounted upon and extending within the receptacle, and means connecting the slides with the rockable frame to obtain translation of the slides alternately in opposite direction as the frame is correspondingly rocked by fowls mounting and leaving the mount bars before and after feeding.

5. A feed receptacle, a mount rockably arranged upon the receptacle to be tipped as the fowls mount and leave it, a lever-like agitator extending through, fulcrumed upon a wall of, and extending into a stored-feed portion of the receptacle, and means by which rocking motion of the rockable element moves the agitator to prevent clogging of the feed, and troughs into which the feed is delivered from the receptacle, said troughs being accessible by fowls when mounted upon the rockable element.

6. A feed receptacle, a mount rockably arranged upon the receptacle to be alternately tipped in opposite directions as the fowls mount, and leave it, a lever-like agitator extending through a wall of and into a stored-feed portion of the receptacle, and means by which rocking motion of the rockable element moves the agitator first in one direction then in the other to maintain the feed in loose condition, and throughs into which the feed is delivered from the receptacle, said troughs being accessible by fowls when mounted upon the rockable element.

7. A feed receptacle having feed troughs one at each opposite side communicating therewith, a slide reciprocably arranged upon the feeding side of each trough and slanting inwardly to deliver dropped food to the trough, a frame arranged upon the receptacle to rock and including mount rails one adjacent each trough arranged so that when mounted by the fowls, said fowls are positioned to feed from the trough, and further arranged so that the frame is alternately rocked in opposite directions as the fowls mount and leave the rails, agitator fingers carried by the slides and extending into and rockably supported upon the reception to agitate the feed and by which the fingers are moved when the slides move, and connections between the frame and the slides whereby as the frame is rocked the slides are translated alternately in opposite directions.

8. A feed receptacle having troughs, a frame having elements pivoted to the receptacle, and having mount bars cross-connecting the first elements and arranged adjacent the troughs, a slide arranged upon each trough to return dropped food thereto, and to slide longitudinally thereof, agitator elements connected to the slides and extending into the receptacle and fulcruming thereon, and means connecting the slides with a rockable frame to cause movement of the slides alternately in opposite directions as the frame is correspondingly rocked by the fowls mounting and leaving the bars.

9. A feed receptacle having troughs one at each opposite side, a rockable frame having elements one pivoted to each of two opposite sides of the receptacle, and having mount bars cross-connecting the first mentioned elements and arranged adjacent the troughs, a slide arranged upon each trough to return dropped food to the trough, and to slide longitudinally of the trough, agitator elements connected to each slide and passing through and fulcruming upon the corresponding wall of the receptacle and extending into the receptacle and means connecting the slides with the rockable frame to cause movement of the slides alternately in opposite directions as the frame is correspondingly rocked by the fowls mounting and leaving the bars.

10. A feed receptacle having troughs one at each opposite side, a rockable frame circumscribing the receptacle and troughs, and having elements one pivoted to each of two opposite sides of the receptacle, and having mount bars cross-connecting the first mentioned elements and arranged adjacent the troughs, a slide arranged upon each trough to return dropped food to the troughs, and to slide longitudinally of the trough, agitator elements connected to the slides and passing through and fulcruming upon the walls of the receptacle and extending into the receptacle and means connecting the slides with the rockable frame to cause movement of the slides alternately in opposite directions as the frame is correspondingly rocked by the fowls mounting and leaving the bars.

11. A feed receptacle having a trough, a mount rockably arranged upon the receptacle, an element translatably mounted to return dropped food to the trough, and connections between the food-returning element and the rockable mount to cause movement of said element alternately in opposite directions as the mount is correspondingly rocked, to vibrate and thus facilitate return of dropped food.

12. A receptacle including sides and end plates which extend transversely beyond the corresponding sides, each end plate having an outwardly extended element as a stop, a single element extending between the plates and co-acting therewith to form a trough at each opposite side of the receptacle and a pivoted frame having elements above said stops and arranged to have their rocking motion limited by said stops, and mount bars cross-connecting said elements and lying adjacent the troughs.

In witness whereof, I have hereunto set my hand this 23rd day of April, 1928.

ANTON W. KEGLER.